United States Patent [19]

Basten et al.

[11] 4,155,838

[45] * May 22, 1979

[54] PROCESS FOR RECOVERING USABLE MATERIALS FROM WASTE CONTAINING METALS AND NON-METALS

[75] Inventors: Albert T. Basten, Voerendaal; Hubert H. Dreissen, Geleen, both of Netherlands

[73] Assignee: Stamicarbon, B.V., Geleen, Netherlands

[*] Notice: The portion of the term of this patent subsequent to Jul. 19, 1994, has been disclaimed.

[21] Appl. No.: 797,348

[22] Filed: May 16, 1977

[30] Foreign Application Priority Data

May 14, 1976 [NL] Netherlands .......................... 7605151

[51] Int. Cl.² .......................... B03B 5/34; B03B 9/06
[52] U.S. Cl. .................................. 209/172.5; 209/211
[58] Field of Search .............. 209/211, 172.5; 241/20, 241/24, 79.1, DIG. 38

[56] References Cited

U.S. PATENT DOCUMENTS

| | | | |
|---|---|---|---|
| 2,724,503 | 11/1955 | Fontein | 209/211 |
| 2,942,792 | 6/1960 | Anderson et al. | 209/172.5 X |
| 3,720,380 | 3/1973 | Marsh | 241/20 |
| 4,036,441 | 7/1977 | Basten et al. | 209/172.5 X |

Primary Examiner—Ralph J. Hill
Attorney, Agent, or Firm—Cushman, Darby & Cushman

[57] ABSTRACT

The present invention relates to a process for separating waste material such as domestic refuse that has already been pretreated in order to eliminate the larger part of the paper, plastic film, food remnants and ferromagnetic materials and the particle size of which has been reduced to less than 70 mm through grinding. The waste material contains both glass and aluminium, in addition to other components. The ground waste material is separated by specific gravity in three hydrocyclones or hydrocyclone-batteries connected in series. In the first hydrocyclone, in which water is used as the separating medium, the lightest materials are separated. In the second hydrocyclone, a final heavy fraction is separated. In the third hydrocyclone, the intermediate fraction obtained in the second hydrocyclone is separated into a final fraction containing practically all the glass and a final fraction containing practically all the aluminium. In the second and third hydrocyclones a heavy suspension, of the same composition in both cyclones, is used as the separating medium.

1 Claim, 1 Drawing Figure

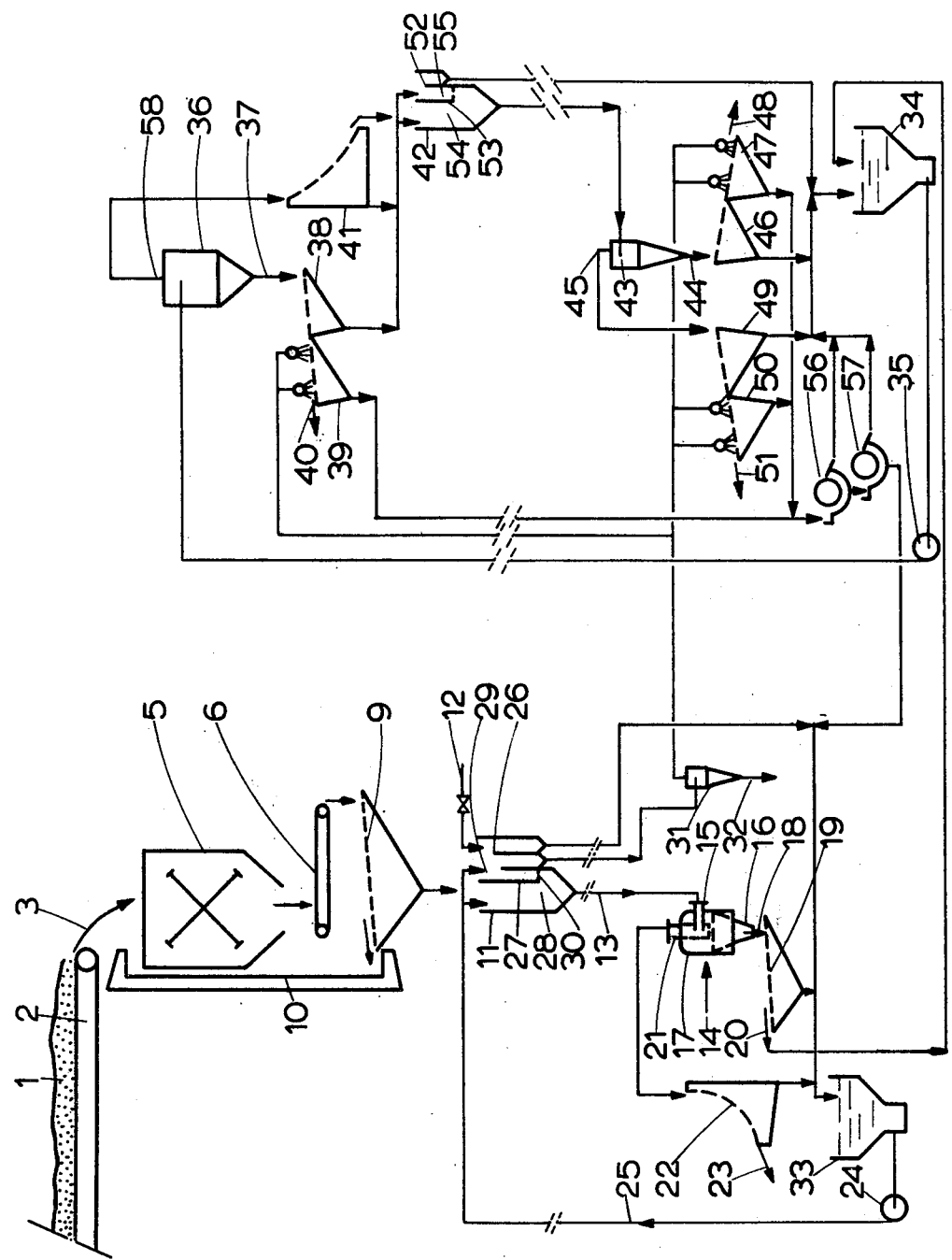

PROCESS FOR RECOVERING USABLE MATERIALS FROM WASTE CONTAINING METALS AND NON-METALS

This invention relates to a process for separating metals from a solid particulate waste material, which comprises the steps of mixing said particulate waste material with water, feeding the mixture to at least one first hydrocyclone and separating said waste material therein by specific gravity into a first fraction and a second fraction, discharging said first fraction together with water at the apex of said first hydrocyclone, discharging said second fraction together with water at the overflow of said first hydrocyclone, draining the water away from said first and second fractions, mixing said first fraction with a liquid separating medium comprising a suspension of fine particles of a weighting material in water and having a specific gravity of at least 2.2, feeding the mixture to at least one second hydrocyclone having an apex angle of the cone-shaped part ranging between 45° to 90° and separating said first fraction therein by specific gravity into a third fraction comprised of particulate solids having a specific gravity of more than 3.0 and a fourth fraction comprised of particulate solids having a specific gravity of less than 3.0, discharging said third fraction together with liquid separating medium at the apex of said second hydrocyclone, discharging said fourth fraction together with liquid separating medium at the overflow of said second hydrocyclone, mixing said fourth fraction with a liquid separating medium of the same composition and the same specific gravity as the medium used in said second hydrocyclone, feeding the mixture to at least one third hydrocyclone having an apex angle of the cone-shaped part ranging between 15° to 25° and separating said fourth fraction therein by specific gravity into a fifth fraction and a sixth fraction, discharging said fifth fraction together with liquid separating medium at the apex of said third hydrocyclone, discharging said sixth fraction together with liquid separating medium at the overflow of said third hydrocyclone and draining the liquid separating medium away from said third, fifth and sixth fractions.

The term "waste material" as used here is meant to include domestic refuse that has already been subjected to a pre-treatment is order to free it in part of paper, plastic flim, food remnants and ferromagnetic materials and that has been ground and/or flattened to a maximum dimension of about 70 mm.

A process of this type is described in the co-pending U.S. Pat. No. 4,036,441, issued July 19, 1977 and which is commonly owned with the present application. In the process use is made of the phenomenon, known in se, that in a separation according to specific gravity in a hydrocyclone the specific gravity of separation can be higher than the specific gravity of the separating medium employed. If use is made of a cyclone the conical section of which has a relatively wide apex angle, such as the second hydrocyclone referred to above, the difference is specific gravity may be rather large, e.g. about 0.7 and over; with a cyclone having a relatively small apex angle, such as the third hydrocyclone referred to above, the difference is usually much smaller, e.g. about 0.2, this being dependent also on the other dimensions of the cyclone and on the process conditions. In this process, therefore, two separations at different specific gravities are effected by means of only one suspension, so that, also, only one suspension regeneration circuit is used, which is economically attractive. Of course, with a system composed of three series-arranged separating cyclones or cyclone batteries, in which water is used as the separating medium in the first cyclone, separating suspensions differing in specific gravity may be used in the second and third cyclones; in this case two regeneration systems are needed, and the economic advantage of the process indicated in the beginning of this application is lacking.

According to the abovementioned U.S. Pat. No. 4,036,441 the process is used for the recovery of metals e.g. from scrapped motorcars, and is carried out in such a way that the first fraction referred to above contains substantially all non-ferromagnetic metals, and that virtually all non-metals are contained in the said second fraction; the third fraction, discharged at the apex of the second cyclone, consists almost entirely of heavy metals, such as copper and copper alloys, and the fourth fraction, discharged at the overflow of this cyclone, contains the lighter metals, which are then separated, in the third hydrocyclone, into the fifth fraction, consisting mainly of aluminum, and the sixth fraction, containing the lighter metals, e.g. magnesium alloys. The fifth fraction in addition contains glass, stemming notably from car windows. In the further processing of the aluminium fraction the presence of this small quantity of glass does not cause much hindrance; also, the size of the glass parts is generally so much smaller than that of the aluminum scrap that, if so desired, the major part of this small quantity can be got rid of in a simple way by screening.

The "waste" from domestic refuse, referred to above, can in many cases contain such an amount of aluminum that recovery thereof becomes attractive. The following is a typical composition of pre-treated "waste" from domestic refuse:

Aluminium—12% wt.
Copper and Zinc—4% wt.
Wood—25% wt.
Glass, earthenware, rubber, etc.—59% wt.

Demands that may be made on the recovery of aluminium are the following:

(1) the aluminium fraction must not contain wood or rubber
(2) the aluminium fraction must not contain heavy metals
(3) the aluminium fraction must not contain glass
(4) the aluminium losses must not amount to more than 15%.

Wood, rubber and heavy metals can be readily separated from aluminium. However, the waste contains glass and earthenware, which the aluminium fraction must be free of. Therefore, application of the abovedescribed method of recovery of the aluminium seems to be less attractive. An aluminium fraction will be expected that contains too much domestic glass as from bottles etc. of a type much less finely splintered than glass from motorcar windows, and less easy to remove by screening.

The present invention is directed to a separation process which is capable of separating waste material comprising domestic refuse containing domestic glass so that a well-usable aluminium fraction is obtained.

According to the invention the material which, in addition to other components, contain both aluminium and glass is so treated in the way indicated in the initial paragraph that after the separation in the said second hydrocyclone virtually all aluminium and glass is contained in the said fourth fraction, and glass and aluminium are separated in the third hydrocyclone, at a specific gravity of the heavy-liquid suspension of 2.30 to 2.50, so that the said fifth fraction contains virtually contains aluminium, and virtually all glass is contained in the said sixth fraction. In the sixth fraction, rich is glass, also other non-metals of relatively high specific gravity may be found, for instance certain specifically heavy rubbers, which may have a specific gravity of about 1.8.

The invention is elucidated with reference to the drawing, which is a diagram of an installation with which the process according to the invention can be realized.

By means of a conveyor 2 pre-treated domestic refuse 1, which contains, i.a., aluminium and glass, is fed, at 3, to a shredder 5, in which it is ground. The ground material is fed, by means of a conveyor 6, to screen 9, on which it is screened. Solids that are too coarse for further treatment—having a size in excess of, say 70 mm—are returned, by a conveyor 10, to shredder 5. The material that has passed through screen 9 is supplied to a feed vessel 11, to which also water can be supplied, via a line 12. Through a line 13 a mixture of solids and water is transported to a first hydrocyclone 14. The feed vessel 11 is at such a height above the hydrocyclone 14 that the said mixture enters the cyclone through the tangential inlet 15 at sufficient speed.

In hydrocyclone 14 a separation is effected between solids of higher and solids of lower specific gravity. The first fraction, consisting of specifically heavier solids (for instance, metals, glass, earthenware, heavy rubbers; s.g., say, higher than 1.5), leaves the cyclone through the discharge opening at the cyclone apex 18, and is dewatered on a dewatering screen 19. The second fraction, consisting of specifically lighter particles (for instance, wood, plastics and light rubbers; s.g., say, lower than 1.5), leaves the cyclone through the vortex finder 21, and is dewatered on a sieve bend 22 and discharged at 23. The water removed on screens 19 and 22 is collected in a pump vessel 33 and returned through a line 25 to the feed vessel 11 by means of a pump 24. The feed vessel 11 is provided with an overflow 26, the object of which is to maintain a constant water pressure at the feed point 15 of cyclone 14. For this purpose use is made by preference of a feed vessel as described in the Netherlands Pat. No. 96726. Accordingly, the feed vessel 11 is provided with a vertical partition, which divides the vessel into two compartments, 28 and 29. Through an opening 30 compartment 29 communicates with compartment 28. Part of the water recirculated through line 25 is supplied, with the solids, to compartment 28, the remaining part of the recirculated water is supplied to compartment 29, the proportion being such that the downward velocity of the water flowing through opening 30 is so high that none of the lighter materials can reach the overflow 26 adjoining compartment 29.

In the recirculated process water fine components will accumulate. To prevent the concentration of fine solids becoming too high, part of the circulating process water is passed through a cyclone thickener 31; the clarified water is re-used, the thickened fraction is discharged at 32.

Hydrocyclone 14 is preferably of the type allowing axial displacement of the conical section 16 with respect to the cylindrical section 17.

The first fraction, leaving the draining screen 19 at 20, is supplied to a mixing vessel 34, where it is incorporated into a heavy suspension consisting of finely ground ferrosilicon in water, with a specific gravity of about 2.42. The mixture of suspension and solids is supplied, by means of a pump 35, to a second hydrocyclone 36, the apex angle of the conical tip of which is 60°. At the discharge opening in the apex 37 of the cyclone a third fraction, consisting of solids with s.g. above about 3.15, together with suspension, is discharged (mainly heavier metals, such as copper and zinc), which is cleared of suspension on a draining screen 38 and a rinsing screen 39, and removed at 40. At the overflow 58 of the second hydrocyclone 36 a fourth, lighter fraction, together with suspension, is discharged, which is largely freed of suspension on a sieve bend 41. This fourth fraction is supplied, together with suspension coming from draining screen 38 and sieve bend 41, to a feed vessel 42, and further supplied from this feed vessel, together with suspension, to a third hydrocyclone 43. In this third hydrocyclone 43, the apex angle of the conical tip of which is 20°, the said fourth fraction is separated into a fifth fraction, consisting mainly of solids having specific gravities higher than 2.60, which is discharged, together with suspension, at the discharge opening in the apex 44 of the hydrocyclone 43, and a sixth fraction, mainly consisting of solids having specific gravities lower than 2.60, which is discharged at the overflow 45 of hydrocyclone 43. The said fifth fraction contains the great majority of the aluminium contained in the feed; it is freed of suspension on a draining screen 46 and a rinsing screen 47, and removed at 48. The sixth fraction, which contains almost all of the glass and, in addition, for instance earthenware and heavy rubbers, is freed of suspension on a draining screen 49 and a rinsing screen 50, and removed at 51.

The feed vessel 42 is at a sufficient height above hydrocyclone 43 and is provided with an overflow 52, the object of which is to bring about the required constant liquid pressure at the feed point of the third hydrocyclone 43. It is of the same type—described in Netherlands Pat. No. 96726—as the feed vessel 11 of the first hydrocyclone: the way in which this type of feed vessel operates has already been described above, with reference to feed vessel 11. Feed vessel 42 is divided into two compartments 54 and 55 by a partition 53; the fourth fraction, coming from sieve bend 41, is supplied to compartment 54, the suspension removed on sieve bend 41 and draining screen 38 is so distributed over the compartments 54 and 55 that no floating solids can reach the overflow 52. In order that the suspension may be distributed over the compartments 54 and 55 in the correct proportion, and to prevent solids getting into the overflow compartment 55, the suspension must be separated from the solids; this is the duty of sieve bend 41. The suspension coming from the draining screens 46 and 49 and the overflow 52 is returned to mixing vessel 34.

The rinsing water used on rinsing screens 39, 47 and 50 is the clarified water coming available at the overflow of cyclone thickener 31. The dilute suspension coming from the rinsing screens is regenerated by means of two series-connected magnetic separators 56 and 57. The regenerated magnetic fraction goes to mixing vessel 34, the water separated out is sent to pump vessel 33, the serve as process water in the first hydrocyclone 14. In this way part of the water is continuously withdrawn from the suspension cycle and sent through the process water cycle of the first hydrocyclone 14, of which, in turn, part is passed through the cyclone thickener 31. Thus, accumulation of fine solids is prevented also in the suspension cycle.

It will now be clear that there is herein provided a process which accomplishes the objectives heretofore set forth. While the present invention has been disclosed in a preferred form, it is to be understood that the specific embodiment thereof, as described and illustrated, is not to be considered in a limited sense as there may be other forms or modifications which should also be considered as coming within the scope of the appended claim.

We claim:

1. A process for separating metals from a solid particulate waste material, which comprises the steps of mixing said particulate waste material with water, feeding the mixture to at least one first hydrocyclone and separating said waste material therein by specific gravity into a first fraction and a second fraction, discharging said first fraction together with water at the apex of said first hydrocyclone, discharging said second fraction together with water at the overflow of said first hydrocyclone, draining the water away from said first and second fractions, mixing said first fraction with a liquid separating medium comprising a suspension of fine particles of a weighting material in water and having a specific gravity of at least 2.2, feeding the mixture to at least one second hydrocyclone having an apex angle of the cone-shaped part ranging between 45° to 90° and separating said first fraction therein the specific gravity into a third fraction comprised of particulate solids having a specific gravity of more than 3.0 and a fourth fraction comprised of particulate solids having a specific gravity of less than 3.0, discharging said third fraction together with liquid separating medium at the apex of said second hydrocyclone, discharging said fourth fraction together with liquid separating medium at the overflow of said second hydrocyclone, mixing said fourth fraction with a liquid separating medium of the same composition and the same specific gravity as the medium used in said second hydrocyclone, feeding the mixture to at least one third hydrocyclone having an apex angle of the cone-shaped part ranging between 15° to 25° and separating said fourth fraction therein by specific gravity into a fifth fraction and a sixth fraction, discharging said fifth fraction together with liquid separating medium at the apex of said third hydrocyclone, discharging said sixth fraction together with liquid separating medium at the overflow of said third hydrocyclone and draining the liquid separating medium away from said third, fifth and sixth fractions, in which process a solid particulate waste material is treated which, in addition to other components, contains both aluminium and glass, and, after the separation in said second hydrocyclone, virtually all aluminium and glass is contained in said fourth fraction, and, after the separation in said third hydrocyclone, using a liquid separating medium having a specific gravity ranging between 2.30 and 2.50, virtually all aluminium is contained in said fifth fraction and virtually all glass is contained in said sixth fraction.

* * * * *